(12) United States Patent
Fournier et al.

(10) Patent No.: US 11,187,340 B2
(45) Date of Patent: Nov. 30, 2021

(54) GAS PRESSURE REDUCER

(71) Applicant: CLESSE INDUSTRIES, Cournon d'Auvergne (FR)

(72) Inventors: Eric Fournier, Saint-Sylvestre Pragoulin (FR); Jean-Luc Papon, Cournon d'Auvergne (FR)

(73) Assignee: CLESSE INDUSTRIES, Cournon d'Auvergne (FR)

( * ) Notice: Subject to any disclaimer, the term of this patent is extended or adjusted under 35 U.S.C. 154(b) by 252 days.

(21) Appl. No.: 16/444,277

(22) Filed: Jun. 18, 2019

(65) Prior Publication Data
US 2019/0383411 A1 Dec. 19, 2019

(30) Foreign Application Priority Data

Jun. 18, 2018 (FR) ...................................... 18/55320

(51) Int. Cl.
*F16K 17/36* (2006.01)
*F16K 7/17* (2006.01)
*F23N 1/00* (2006.01)

(52) U.S. Cl.
CPC ................ *F16K 17/36* (2013.01); *F16K 7/17* (2013.01); *F23N 1/007* (2013.01); *F23N 2235/24* (2020.01)

(58) Field of Classification Search
CPC ......... Y10T 137/7831; Y10T 137/7795; Y10T 137/8225; Y10T 137/8275; F23N 1/007; F23N 7/17; F23N 2235/24; F16K 17/36; F16K 7/17
See application file for complete search history.

(56) References Cited

U.S. PATENT DOCUMENTS

| 344,990 | A | * | 7/1886 | Rossney | F16K 17/194 137/248 |
| 3,386,465 | A | * | 6/1968 | Johnson | G05D 16/0694 137/463 |
| 7,353,834 | B2 | * | 4/2008 | Childers | G05D 16/0686 137/14 |
| 7,360,555 | B2 | * | 4/2008 | Bruhat | G05D 23/023 137/460 |
| 10,222,811 | B2 | * | 3/2019 | Jing | F16K 17/048 |
| 10,247,327 | B2 | * | 4/2019 | Doughty | G05G 1/015 |
| 10,760,710 | B2 | * | 9/2020 | Tsou | F16K 37/0008 |
| 2012/0261005 | A1 | * | 10/2012 | Cojocaru | F16K 17/32 137/461 |

FOREIGN PATENT DOCUMENTS

| EP | 0907119 A1 | * | 4/1999 | ......... G05D 16/0688 |
| FR | 2984448 B1 | * | 11/2014 | ......... F16K 37/0008 |
| GB | 2499087 A | * | 8/2013 | ......... F16K 37/0008 |
| WO | WO-2006098577 A1 | * | 9/2006 | ............. F17C 13/04 |

* cited by examiner

*Primary Examiner* — Jessica Cahill
(74) *Attorney, Agent, or Firm* — Burris Law, PLLC

(57) ABSTRACT

A gas pressure reducer with a safety function in the case of under-pressure includes a lever having a first portion pivotally mounted on a body about a first axis and adapted to seal the gas intake, and a second portion pivotally mounted on the first portion about a second axis and cooperating with a finger secured to a flexible diaphragm.

3 Claims, 5 Drawing Sheets

GAS PRESSURE REDUCER

CROSS-REFERENCE TO RELATED APPLICATIONS

This application claims priority to and the benefit of FR 18/55320 filed on Jun. 18, 2018. The disclosure of the above application is incorporated herein by reference.

FIELD

The present disclosure relates to a pressure reducer with an integrated under-pressure safety.

BACKGROUND

The statements in this section merely provide background information related to the present disclosure and may not constitute prior art.

In a widespread manner, liquefied petroleum gas (LPG, such as for example butane, propane, or mixtures thereof) is used for domestic purposes.

This gas allows operating domestic appliances such as boilers or gas cookers.

Usually, this gas is stored under high pressure in the liquid state in reservoirs (bottles or vats) whose capacity may typically vary from 0.5 kg to 1500 kg, and which are replaced or refilled when empty.

The gas that arrives in the boilers or the gas cooker must be at a pressure much lower than that of the storage reservoir: this operating pressure must typically be in the range of 29, 37 or 50 mbar, or other low pressures.

It is therefore necessary to place a device for reducing the pressure between the gas reservoir and the concerned domestic appliance: such a device, commonly called a pressure reducer, allows, thanks to a valve system, obtaining flow rate regulation (typically 4 to 5 kg of gas per hour) and pressure regulation (typically 29, 37 or 50 mbar) of the gas supplying the domestic appliance.

It may happen that impurities coming from the reservoir partially or entirely seal the gas intake of the pressure reducer, or that there is a leakage of the gas pipe interposed between the gas outlet of the pressure reducer and the domestic appliance: in either case, an under-pressure in the pressure reducer is observed, and safety standards require that the pressure reducer is put in a safety configuration, that is to say it stops the gas flow.

For this reason, there are in the state of the art safety systems commonly called "UPSO" ("Under Pressure Shut-Off," closing in case of under-pressure or excess flow rate), allowing interrupting the gas flow rate exiting the pressure reducer in case of under-pressure of this gas in the pressure reducer.

SUMMARY

The present disclosure provides a pressure reducer equipped with a safety system which features a simple design, having a reduced number of parts and ultimately inexpensive.

The present disclosure provides a gas pressure reducer including:
a body;
a gas intake and outlet opening into the body;
a flexible diaphragm defining with the body a regulation chamber of variable volume;
an actuation finger and clevis secured to the diaphragm;
a gas intake flow rate regulation lever cooperating with the finger and pivotally mounted in the chamber between:
a first closure position corresponding to a maximum volume of the chamber, in which the lever seals the gas intake,
a maximum opening position corresponding to an intermediate volume of the chamber, in which the lever clears a maximum passage through the gas intake, and
a second closure position corresponding to a minimum volume of the chamber, in which the lever seals the gas intake,
the lever comprising a first portion pivotally mounted on the body about a first axis and adapted to seal the gas intake, and a second portion pivotally mounted on the first portion about a second axis and cooperating with the finger;
elastic means (i.e., a resilient member), such as for example, a spring, for biasing the diaphragm towards the position defining a minimum volume of the chamber; and
a stop secured to the body, disposed between the finger and the second axis,
the finger and the stop holding the second lever portion in a position inclined with respect to the first lever portion when the lever is in the second closure position, which inclination holds the first lever portion in the sealing position of the gas intake.

As a result of these features, when there is no more pressure inside the pressure reducer chamber, the second portion of the regulation lever seals the gas intake.

This allows placing the pressure reducer in the safety position, for example when an impurity seals the gas intake, or when there is a gas leakage downstream the pressure reducer, or a gas shut-off upstream the pressure reducer because of an empty bottle/cistern.

It should be noted that the only modification with regards to a conventional pressure reducer lies in the particular structure of the lever, and incidentally in the making of a stop in the body of the pressure reducer.

These modifications allow achieving the desired safety function at a very low cost, without bringing any significant change to an existing pressure reducer.

According to other optional features of the pressure reducer:
a spiral spring is interposed between the first and second portions of the lever, this allows holding these two lever portions immobile relative to each other when the lever moves between its first closure position and its maximum opening position, that is to say in the regulation configuration. In other words, the spring enables the lever to behave as if it were formed in one piece, in the regulation configuration; and/or
the pressure reducer includes a rod secured to the finger, and a safety indicator cooperating with the rod, tilting towards a position visible from outside the pressure reducer when the diaphragm is in the position defining a minimum volume of the chamber. This safety indicator allows the user to easily visualize the switch of the pressure reducer in the safety configuration, prompting the user to intervene to remedy the issue causing a pressure drop in the pressure reducer chamber (e.g. downstream pipe breakage, upstream gas supply cut-off, bottle replacement, etc.).

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
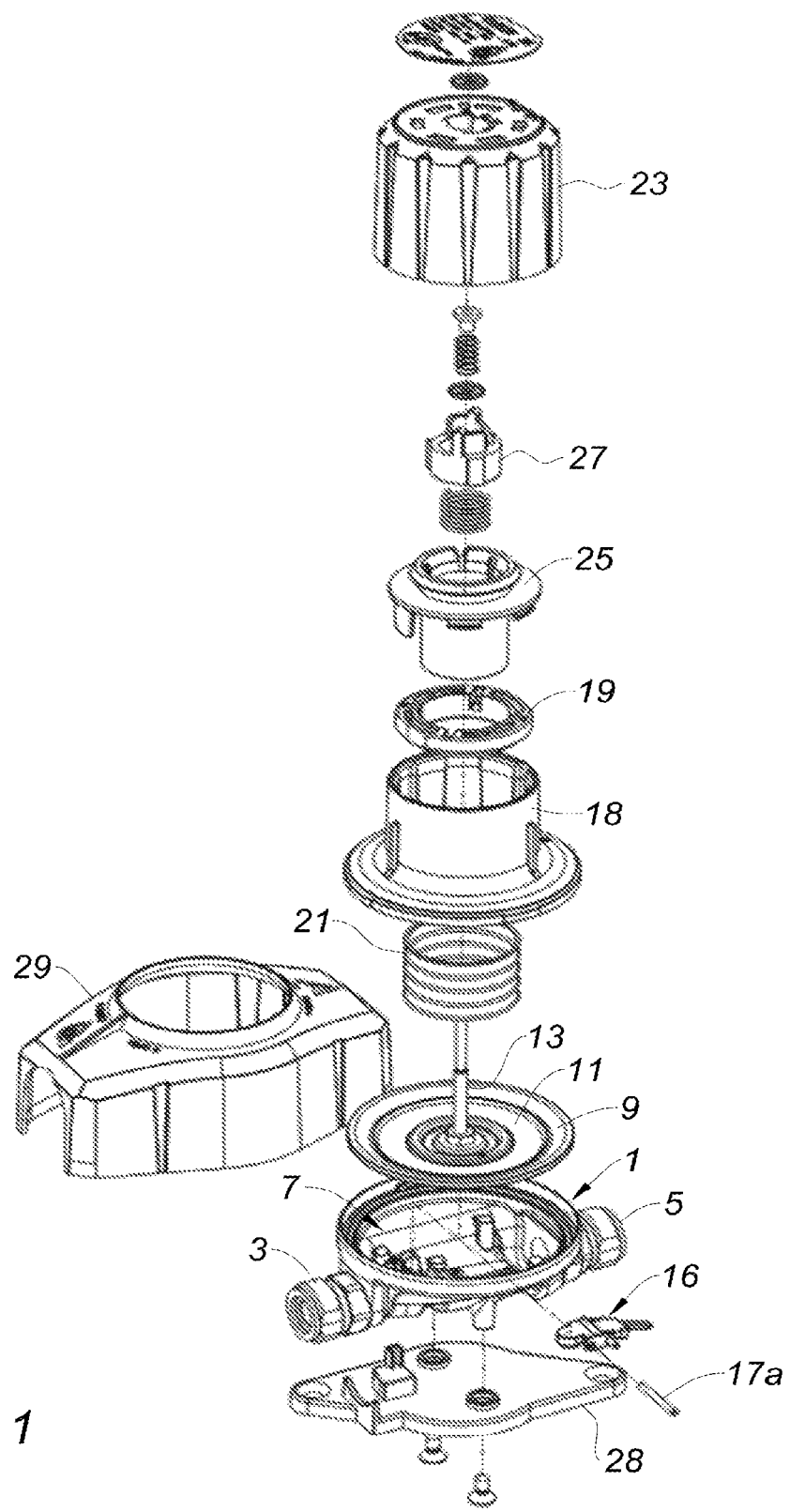
FIG. 1 is an exploded perspective view of a pressure reducer according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 4:
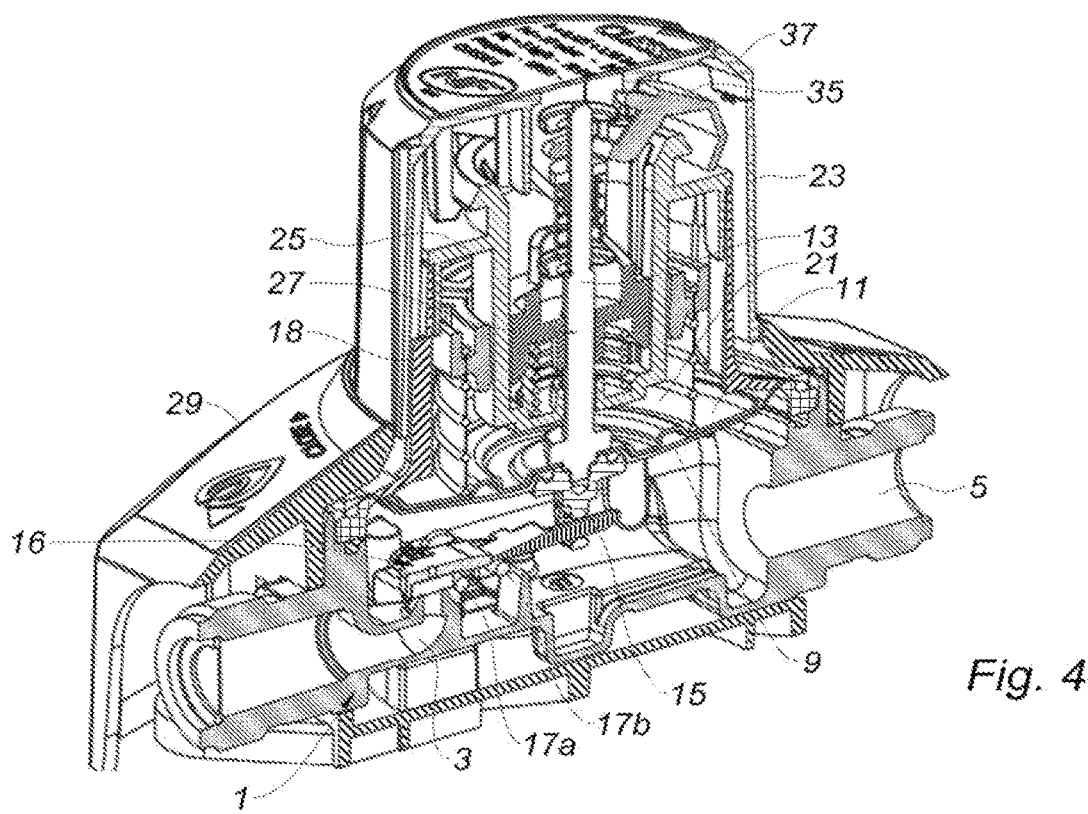
FIG. 4 is an axial cross-sectional view of the pressure reducer of FIG. 2.

Referring now more particularly to FIGS. 1 and 4 where it is shown that the pressure reducer according to the present disclosure includes a body 1, provided with a gas intake 3 and a gas outlet 5 opening into the inside of this body.

The body 1 defines a chamber 7 intended to be tightly closed by a flexible diaphragm 9, so as to form a gas pressure regulating chamber of variable volume.

A metal plate 11 bears on the flexible diaphragm 9, and is held in contact with the latter by a rod 13 screwed into a finger 15 disposed on the side of the flexible diaphragm 9 located inside the chamber 7.

The finger 15 cooperates with a lever 16 pivotally mounted inside the body 1, about a first axis 17a, as will be explained in more detail in the following.

The flexible diaphragm 9 tightly closes the chamber 7 by a cover 18 crimped on the body 1.

An adjusting ring 19 is screwed inside the cover 18.

A regulation spring 21 is interposed between the ring 19 and the metal plate 11.

A stop handle 23, pivotally mounted on a sleeve 25 itself fastened to the cover 18, allows, by cooperation with a cam 27 on which the rod 13 is fixedly mounted in translation, locking the lever 16 in a first closure position, as will be explained in the following.

The body 1 is screwed onto a plate 28 allowing fastening the pressure reducer on a suitable support.

Figure 2:
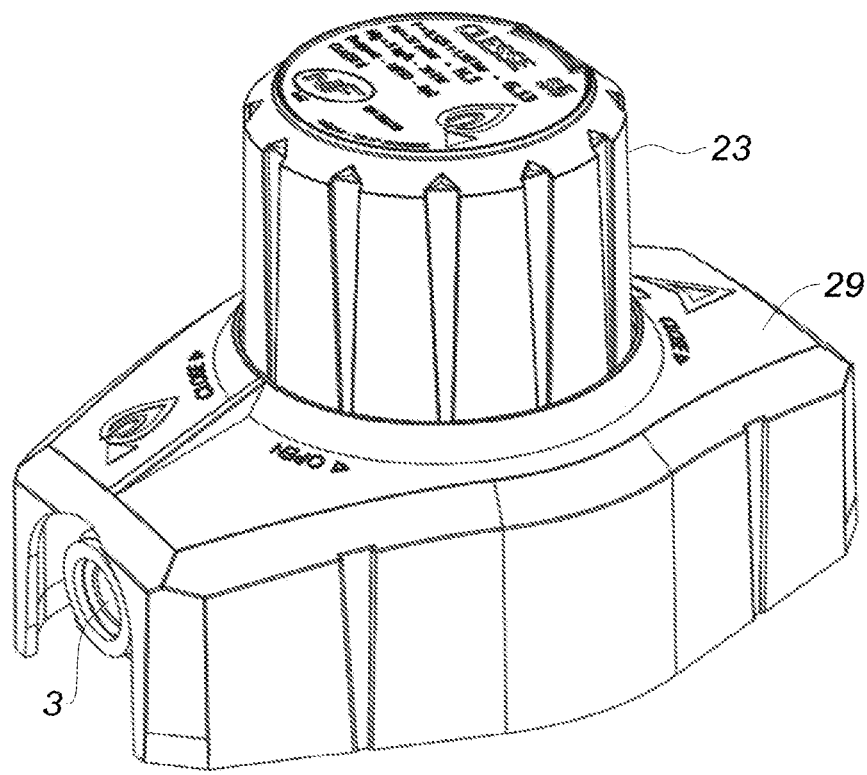
FIG. 2 is a perspective view of the pressure reducer of FIG. 1 in an assembled state according to the present disclosure.
Figure 3:
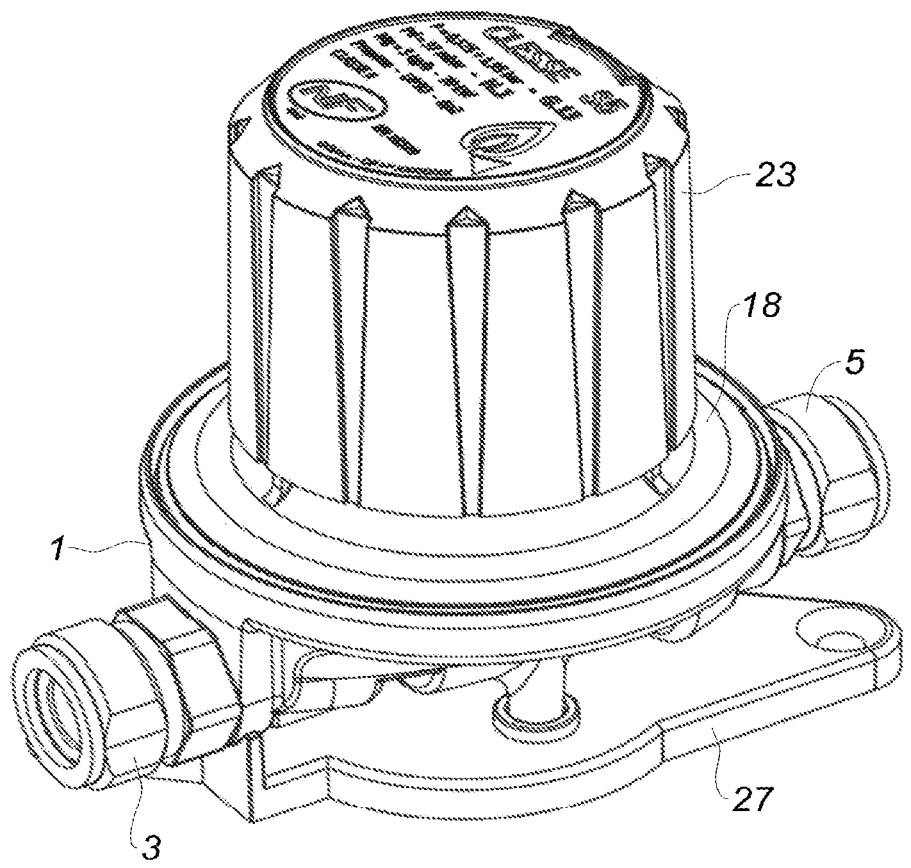
FIG. 3 is a perspective view of the pressure reducer of FIG. 2 in which a protective cover is not shown for ease of illustration.

The entire pressure reducer is bodied by a cowl 29 including opening and closing indications, useful for the user, as shown more particularly in FIG. 2; the appearance of the pressure reducer according to the present disclosure, once the cowl 29 has been removed, is shown in FIG. 3.

Figure 5:
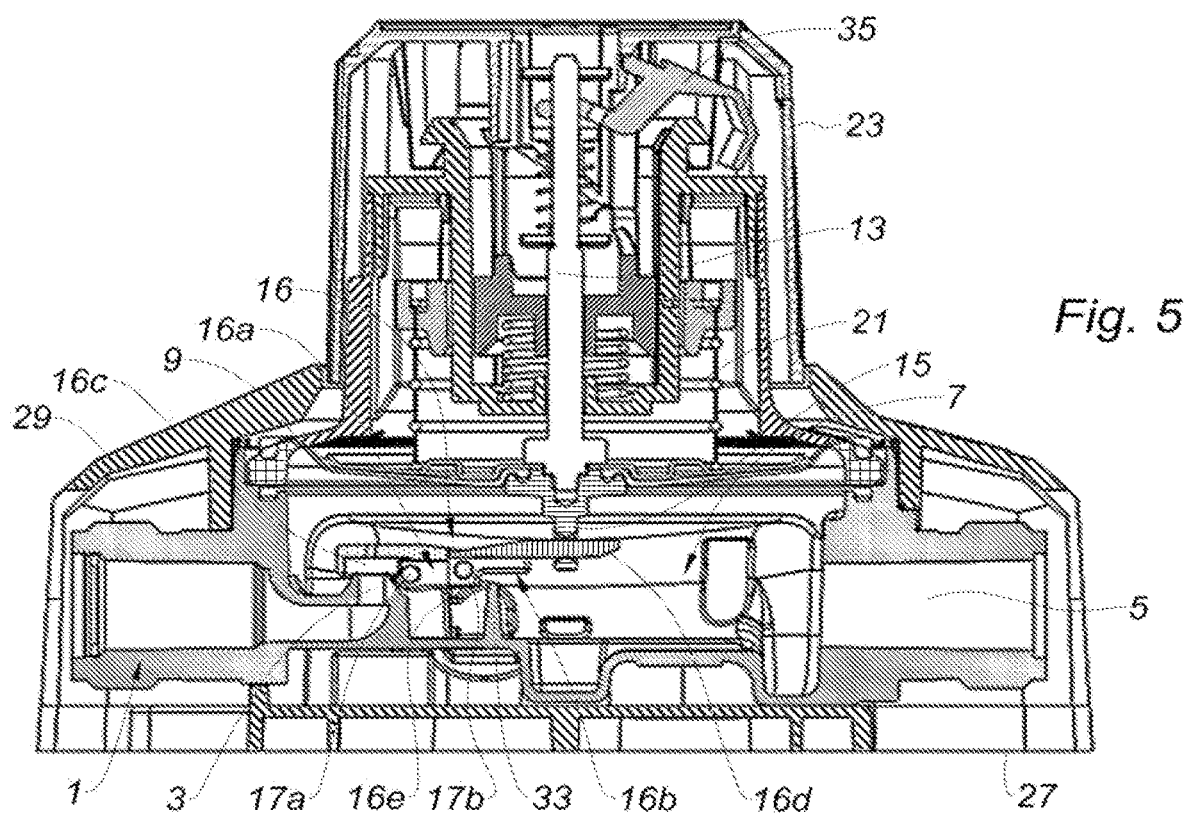
FIG. 5 is an axial cross-sectional view of the pressure reducer of FIG. 2, illustrated in a first closure position according to the present disclosure.

Referring now more particularly to FIGS. 4 and 5, on which there is shown the pressure reducer according to the present disclosure which is in a first closure position.

It is shown more particularly in these figures that the lever 16 includes 2 portions, namely a first portion 16a pivotally mounted relative to the body 1 about the first axis 17a, and a second portion 16b pivotally mounted relative to the first portion 16a about a second axis 17b.

The first portion 16a of the lever 16 includes a valve 16c adapted to seal the gas intake 3.

The second portion 16b of the lever 16 includes a tail 16d adapted to cooperate with the finger 15 secured to the flexible diaphragm 9.

A spiral spring 16e tends to hold the first 16a and second 16b portions of the lever 16 in alignment with each other.

In the configuration represented in FIGS. 4 and 5, the lever 16 is in a first closure position.

In this first closure position, the volume of the chamber 7 is maximum, so that the finger 15 is in its highest position, with regards to the height of the drawing sheet.

In this highest position, the finger 15 holds the valve 16c against the seat of the gas intake 3, thus sealing this intake.

Figure 6:
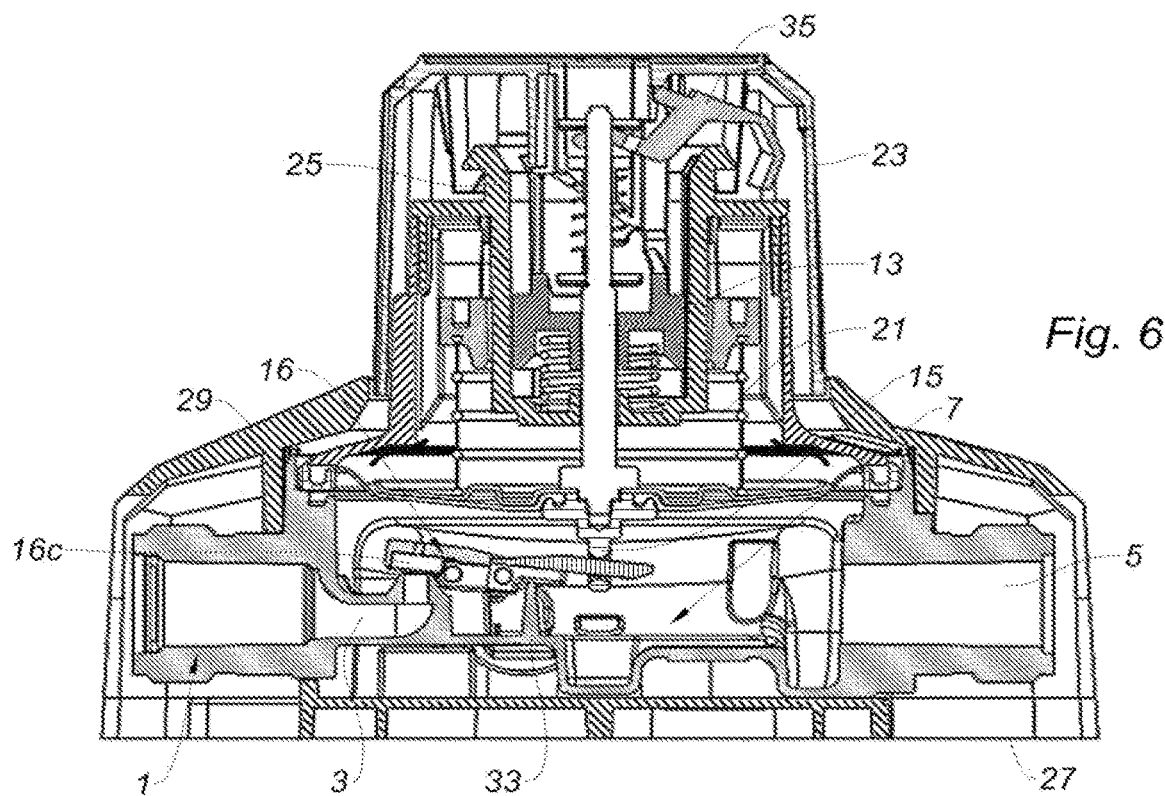
FIG. 6 is an axial cross-sectional view of the pressure reducer of FIG. 2, illustrated in a maximum opening position according to the present disclosure.

In the configuration represented in FIG. 6, the lever 16 is in a maximum opening position. In this position, the finger 15 is lowered relative to its position of FIGS. 4 and 5, authorizing the valve 16c to move away from the seat of the gas intake 3, thus enabling gas to flow from the gas intake 3 to the inside of the chamber 7, then to exit the pressure reducer by the gas outlet 5.

Figure 8:
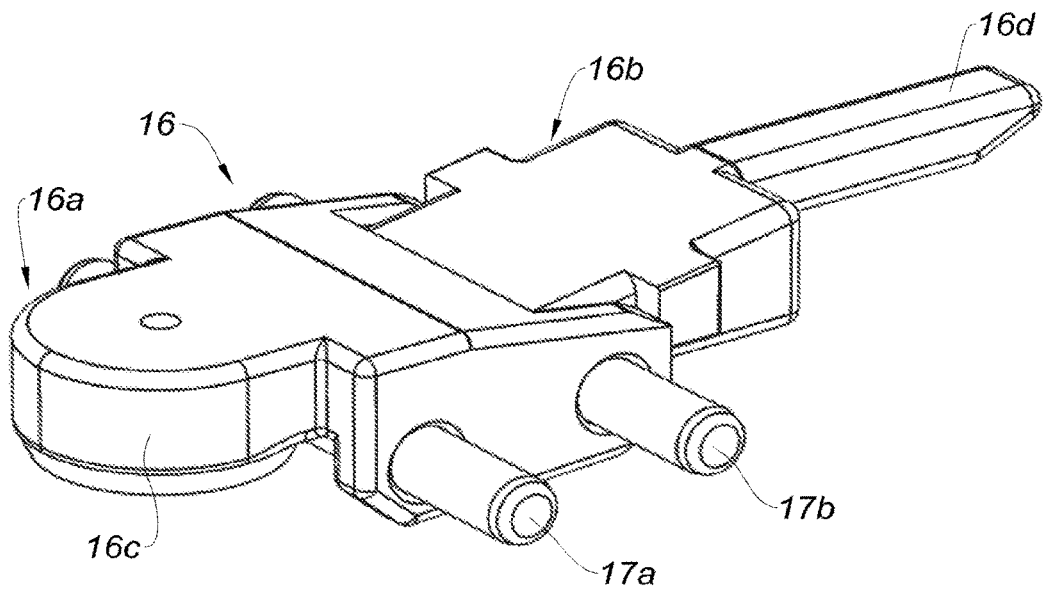
FIG. 8 is a perspective view of a lever of the pressure reducer of FIGS. 1-7, illustrated in a position corresponding to the first closure position of FIG. 5 and the maximum opening position of FIG. 6.

In this position, the first 16a and second 16b portions of the lever 16 remain in alignment with each other, under the effect of the elastic return exerted by the spiral spring 16e, as shown more specifically in FIG. 8.

The variations of the gas pressure inside the chamber 7 have the effect, by action on the flexible diaphragm 9 and thus on the finger 15 and on the lever 16, of sealing more or less the gas intake 3, and thus achieving the desired regulation function for the pressure reducer.

All the parts and movements are calibrated so as to be able to convert the pressure of the gas coming from the reservoir (not represented) to the desired gas pressure for the use of the domestic appliance located downstream of the pressure reducer (also not represented).

Figure 7:
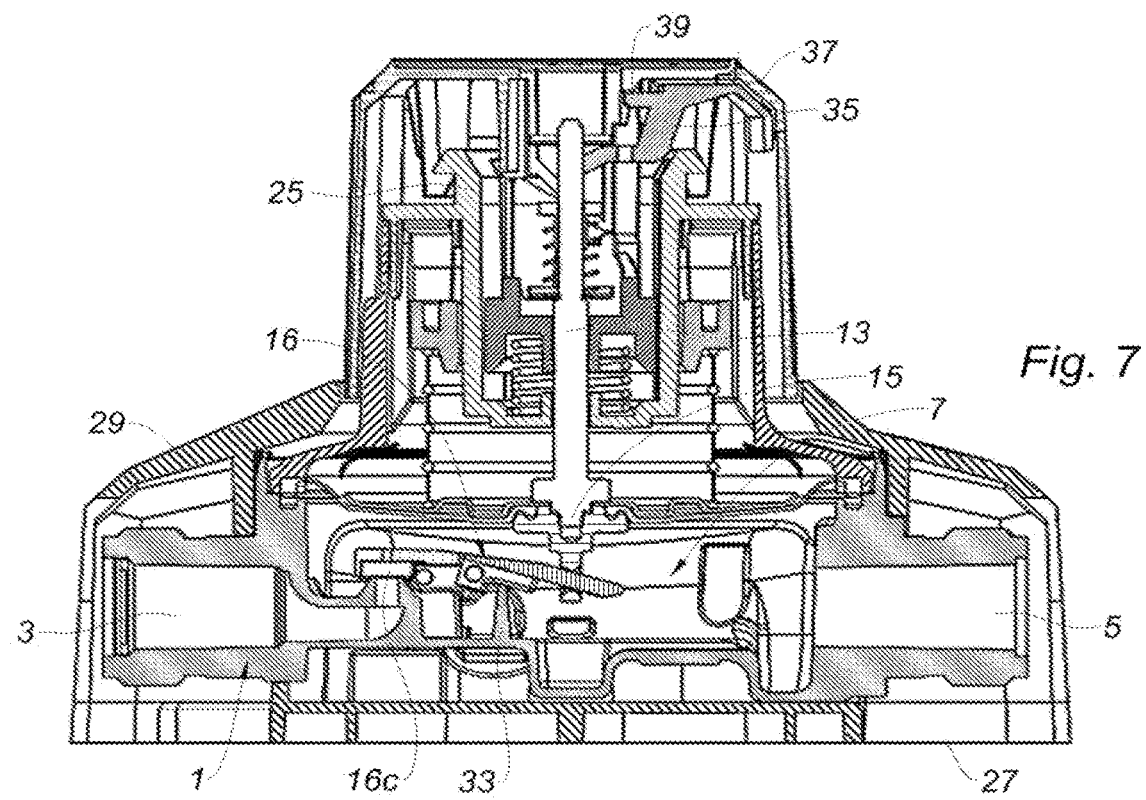
FIG. 7 is an axial cross-sectional view of the pressure reducer of FIG. 2, illustrated in a second closure position corresponding to a safety configuration according to the present disclosure.

In the configuration of FIG. 7, the lever 16 is in a second closure position, corresponding to a minimum volume of the chamber 7, that is to say in the lowest position of the finger 15.

The lowest position of the finger 15 has the effect of lowering the second portion 16b of the lever 16 in contact with a stop 33 formed, and in one form, in the material of the body 1, in the bottom of the chamber 7.

The force exerted by the finger 15 on the tail 16d of the second portion 16b of the lever 16 has the effect of pivoting the second portion relative to the first portion 16a about the second axis 17b, which then pivots in turn about the first axis 17a, and then comes to seal the gas intake 3.

Figure 9:
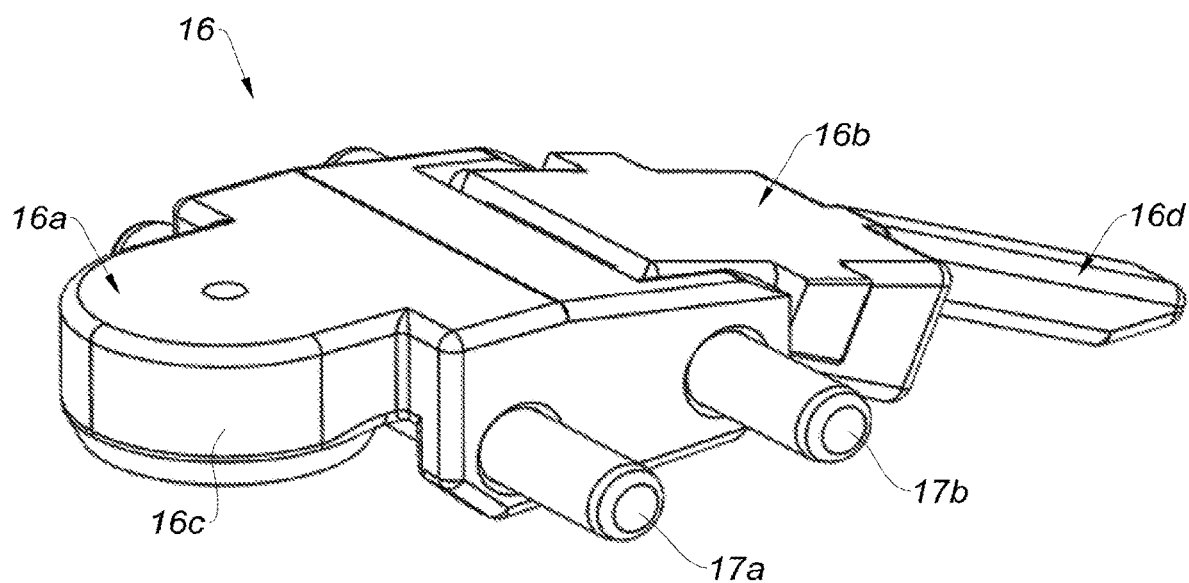
FIG. 9 is a perspective view of the lever of FIG. 8, illustrated in a position corresponding to the second closure position of FIG. 7.

This configuration, shown more specifically in FIG. 9, corresponds to an absence of gas pressure inside the chamber 7, due to an anomaly such as the presence of an impurity sealing the gas intake 3, or to the presence of a leakage in the installation located downstream of the gas outlet 5, or a lack of upstream pressure which results in zero pressure in the expansion chamber.

The pressure reducer is then placed in a so-called safety position, inhibiting any flow of gas, and involves intervention to remedy the anomaly.

The attention of the user is drawn by an indicator 35, for example a bright color, which tilts under the action of the displacement of the rod 13 from a position shown in FIGS. 5 and 6 where it is separated from a transparent window 37 formed on the upper portion of the button/handle 23, to a position where it almost comes into contact with the window, by tilting about an axis 39 under the action of the rod 13, thus becoming visible to the user who understands that the pressure reducer has been placed in the safety position.

It should be noted that the indicator 35 is optional, and that the pressure reducer may also be delivered without the indicator.

The operation mode and the advantages of the pressure reducer according to the present disclosure result directly from the foregoing description.

The button 23 allows, when actuated in rotation, locking on demand the lever 16 in its first blocking position shown in FIGS. 4 and 5. In this position, the gas cannot flow from the reservoir to the domestic appliance.

When the user places the button 23 in the opening position, the rod 13 can be freely displaced in translation along its axis, depending on the pressure exerted by the gas located in the chamber 7 against the flexible diaphragm 9.

The displacements of the rod 13, and therefore of the finger 15, have the effect of actuating the tail 16d of the lever 16, this having in turn the effect of more or less moving the valve 16c away from the seat of the gas intake 3, and thus achieving the function of regulating the gas pressure inside the chamber 7. A high pressure of gas inside the chamber 7 has the effect of lifting the flexible diaphragm 9, and thus via the finger 15, closing the gas intake 3. Conversely, a relatively low gas pressure inside the chamber 7 has the effect of lowering the flexible diaphragm 9, and consequently moving the valve 16 away from the seat of the gas intake 3, and therefore increasing the gas pressure inside the chamber 7.

In the case of a very large drop in the pressure inside the chamber 7, or even in the case of zero pressure, the flexible diaphragm 9 is displaced towards its lowest possible position shown in FIG. 7, defining a minimum volume of the chamber 7.

In this low position, the second portion 16b of the lever 16 is supported by the finger 15 against the stop 33, as explained above, thus causing a variation in angle of the second portion 16b of the lever 16 which then pivots about the second axis 17b relative to the first portion 16a of the lever 16, thus causing the pivoting of the first portion 16a about its first axis 17a, and thus the closure of the seat of the gas intake 3 by the valve 16c.

In this safety position of the pressure reducer, the flow of gas is completely shut off, until one intervenes to remedy the anomaly by unblocking the gas intake, by restoring the downstream pressure by replacement of bottle, or by eliminating the leakage downstream of the pressure reducer.

As explained above, the attention of the user on this anomaly is drawn by the indicator 35, by transparency through the window 37.

As can be understood in light of the foregoing, the present disclosure provides a very simple way for providing the safety of a pressure reducer in case of under-pressure/excess flow rate. This safety is achieved through the particular design of the lever 16 in two portions hinged relative to each other, and the making of a stop 33 in the mass of the body 1, capable of modifying the relative inclination of these two lever portions.

This very simple arrangement allows, at lower cost and with a very limited number of parts, and without significantly modifying a conventional pressure reducer, achieving the desired UPSO function.

It should be noted that if it is desired to forgo this UPSO function, the hinged lever 16 may be replaced by a lever formed in one piece.

The present disclosure is not limited to the described and represented form.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The description of the disclosure is merely exemplary in nature and, thus, variations that do not depart from the substance of the disclosure are intended to be within the scope of the disclosure. Such variations are not to be regarded as a departure from the spirit and scope of the disclosure.

As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A gas pressure reducer comprising:
   a body;
   a gas intake and outlet opening into the body;
   a flexible diaphragm defining with the body a regulation chamber of variable volume;
   an actuation finger secured to the flexible diaphragm;
   a lever cooperating with the actuation finger and pivotally mounted in the regulation chamber between:
   a first closure position corresponding to a maximum volume of the regulation chamber in which the lever seals the gas intake,
   a maximum opening position corresponding to an intermediate volume of the regulation chamber in which the lever unseals the gas intake allowing gas to flow from the gas intake to an inside of the chamber, and
   a second closure position corresponding to a minimum volume of the regulation chamber in which the lever seals the gas intake,
   wherein the lever comprises a first portion pivotally mounted on the body about a first axis and adapted to seal the gas intake, and a second portion pivotally mounted on the first portion about a second axis and cooperating with the actuation finger;
   a resilient member for biasing the flexible diaphragm towards the second closure position; and
   a stop secured to the body, the stop disposed between the actuation finger and the second axis,
   wherein the actuation finger and the stop holds the second lever portion in an inclined position with respect to the first lever portion when the lever is in the second closure position such that the first lever portion is held in the sealing position of the gas intake.

2. The gas pressure reducer according to claim 1, wherein a spiral spring is interposed between the first and second lever portions of the lever.

3. The gas pressure reducer according to claim 1 further comprising a rod secured to the actuation finger and a safety indicator cooperating with the rod and tilting towards a position visible from outside the pressure reducer when the flexible diaphragm is in the second closure position defining the minimum volume of the chamber.

* * * * *